United States Patent [19]

Sakamoto

[11] Patent Number: 4,640,488

[45] Date of Patent: * Feb. 3, 1987

[54] SEAT SUSPENSION

[75] Inventor: Takao Sakamoto, Akishimashi, Japan

[73] Assignee: Tachikawa Spring Co., Ltd., Japan

[*] Notice: The portion of the term of this patent subsequent to Sep. 16, 2003 has been disclaimed.

[21] Appl. No.: 688,980

[22] Filed: Jan. 4, 1985

[51] Int. Cl.$^4$ ............................................. F16M 13/00
[52] U.S. Cl. ................................... 248/588; 108/145; 248/564; 248/594
[58] Field of Search ............... 248/588, 592, 594, 595, 248/564, 574, 421, 422; 297/338, 345; 108/145; 296/65 R

[56] References Cited

U.S. PATENT DOCUMENTS

| | | | |
|---|---|---|---|
| 3,390,857 | 7/1968 | Nyström | 248/564 |
| 3,473,844 | 10/1969 | Zinnkann | 297/345 |
| 3,826,457 | 7/1974 | de Longchamp | 248/564 |
| 4,072,287 | 2/1978 | Swenson et al. | 248/588 X |
| 4,128,225 | 12/1978 | Klüting et al. | 248/421 |
| 4,151,973 | 5/1979 | Sedlock | 248/588 X |
| 4,382,573 | 5/1983 | Aondetto | 248/588 X |
| 4,448,386 | 5/1984 | Moorhouse et al. | 248/564 |

Primary Examiner—Ramon O. Ramirez
Attorney, Agent, or Firm—Hoffmann, Dilworth, Barrese & Baron

[57] ABSTRACT

A seat suspension featuring a weight-responsive, height-adjusting mechanism which is advantageously employed in a seat intended to be installed in a smaller sized vehicle is disclosed. The seat suspension includes a pair of shock absorbers arranged at the lower portion of X-shaped links with its height being substantially the same as that of the lower portion of said links.

5 Claims, 7 Drawing Figures

SEAT SUSPENSION

BACKGROUND OF THE INVENTION

1. Field of Invention

The present invention relates to a seat suspension provided with a body-weight adjusting device and, in particular, relates to a seat suspension of this type having a thin, or shallow, structure especially suitable for seats installed in vehicles of smaller size.

2. Description of the Prior Art

While a seat suspension possessing a body-weight adjusting device has been employed in vehicles generally of the larger size category, proposals have been made to provide such a seat suspension in smaller size vehicles as well. However, due to limitations of space typical of smaller vehicles, the seat is necessarily somewhat taller when such a body-weight adjustable seat suspension is provided therein. This, of course, poses a problem for the use of a seat suspension having such a capability in smaller sized vehicles.

By way of example, a typical seat suspension of the aforesaid type will be briefly described with reference to FIG. 1 and 2 of the accompanying drawings. In FIG. 1, (1) and (2) designate an upper frame and a lower frame, respectively, of a seat. Lower frame (2) is formed substantially in a rectangular shape and made of a metallic frame substantially channel-shaped in section with the opening defined in the thus channel-shaped frame being faced to each other inwardly to the frame. Upper frame (1) is basically formed in a flat, plate-like shape with both the lateral portions thereon, or the operationally required portions thereof, being bent downwards. The frame is made of metallic material of a configuration substantially conforming to that of lower frame (2). To this upper frame (1), a cushion member is mounted, using what may be termed a "cushion pan" (not shown).

Between upper frame (1) and lower frame (2), there is interposed a pair of X-shaped links (3) which constitute a seat suspension. This seat suspension is of a well-known type and comprises two links (4) and (5) rotatably, pivotally supported at pivot means (6) substantially centrally of each link. Upper end portion (5b) of each of links (4) and (5) is rotatably fixed by pivot means (7) to upper frame (1) rearwardly to the links, whereas lower end portion (4b) thereof is rotatably fixed by pivot means (8) to lower frame (2) with the other lower end portion portion (5b) being slidably secured to lower frame (2) by means of a roller (9), or the like, so as to be movable forwardly and rearwardly relative to lower frame (2). The forwardly-located upper end portions (4a) of X-shaped links (3) are coupled by means of a frame member (10) extended therebetween, thereby supporting the forward portion of upper frame (1) in a direction from the bottom of the seat. The rearwardly-located upper end portions (5a) are coupled by means of a frame member (11) to which a pair of tension springs (12) are secured one at each end thereof.

With reference to both FIG. 1 and 2, a bell crank (14) is rotatably fixed by pivot means (13) to the inner surface of upper frame (1) in such an arrangement that one end portion thereof is engaged with a nut (21) of an adjusting spindle (15) while the other end portion thereof is rotatably connected to one end of a tension frame (16) by means of pivot means (17). Tension frame (16) is connected at the other end thereof to the center portion of an equalizer frame (18) by pivot means (19) so as to be rotatable about said pivot means. Equalizer frame (18) is secured at both ends thereof to the other ends of the foregoing pair of tension springs (12), respectively. Adjusting spindle (15) consists of a rotary shaft with a thread (20) partially formed thereon, nut (21) being engaged with said thread.

Substantially at the center of the thus-constructed seat, a shock absorber (22) is arranged such that the one end thereof is rotatably affixed to the rear frame section of lower frame (2) and the other end is rotatably fixed to rod (10).

In the above-described conventional seat suspension arrangement, when coupled by a person, the seat moves downwardly due to the occupant's weight pressing upon and lowering X-shaped links (3) provided thereunder thereby reducing the height of upper frame (1). However, in this instance, although the seat suspension is compressed into a relatively thin shape, yet by reason of the fact that shock absorber (22) extends centrally between the pair of X-shaped links (3) obliquely thereto and tension springs (12) are disposed above the X-shaped links centrally thereof, the total height of the seat suspension involves protruding elements at its center portion and consequently the seat suspension is prevented from assuming a lower, or more shallow, profile.

SUMMARY OF THE INVENTION

With a view to avoiding the above-mentioned drawback found in the foregoing conventional seat suspension, it is a primary object of the present invention to provide a seat suspension with a body-weight adjusting device having a thin, or shallow, structure permitting its use in a seat intended to be installed in vehicles where the space between the seat and the floor is relatively narrow and the range of vertical movement of the seat suspension is relatively limited.

To accomplish this object, the seat suspension of the present invention possesses a shock absorber arranged at the lower portion of the X-shaped links with its height being substantially the same as that of the lower portion of said links. Thus, the seat suspension on the whole can be of a very thin structure relative to the foregoing conventional structure which possesses a shock absorber disposed centrally thereof. Therefore, the seat structure herein is readily adapted for use in a seat intended for smaller vehicles.

It is another object of the present invention to provide a seat suspension having smaller dimensions and reduced weight relative to the afore-described conventional seat suspension.

To this end, the seat suspension of the present invention includes a pair of shock absorbers, the arrangement of which is such that one of them is disposed at the left lateral side of the heat suspension while the other is disposed at the right lateral side of the seat suspension. This permits the use of a relatively small, light-weight shock absorber and reduces the weight of the seat suspension far greater in comparison to said conventional seat suspension.

DESCRIPTION OF THE PREFERRED EMBODIMENTS

Figure 2:
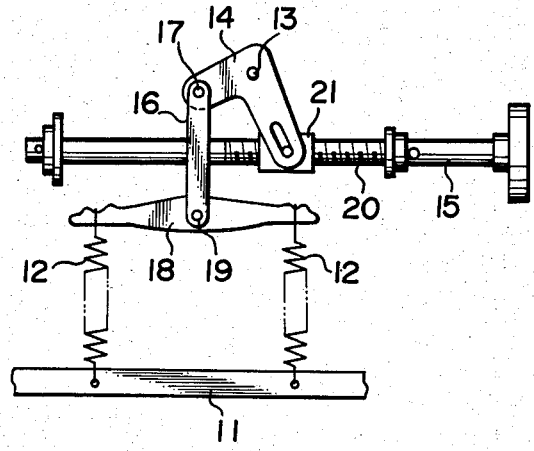
FIG. 2 is a plan view of one portion of said conventional seat suspension.
Figure 3:
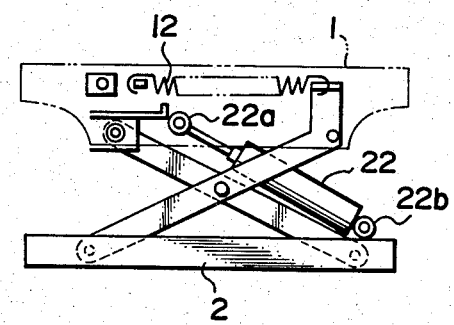
FIG. 3 is a diagrammatic side view of the conventional seat suspension as shown in FIG. 1.

Some embodiments of the present invention will be described in connection with FIGS. 4-7. However, reference is also made to FIGS. 1-3 for better understanding of the present invention since like designations will appear which refer to like parts or components.

According to the present invention, a pair of tension springs (12) are disposed above, and adjacent to, a pair of X-shaped links (3) in a parallel relationship therewith, with each of said springs (12) being so arranged that one end of each is connected to the respective upper ends (5a) of X-shaped links (3) and the other end of each spring is connected to each end of a pair of bell cranks (14). Each of the other ends of the bell cranks is engaged with nut (21) which is in threaded engagement with adjusting spindle (15). (See FIG. 5 in conjunction with FIG. 2.) Bell cranks (14) are rotatably fixed to a suitable portion, that is, the inner surface of upper frame (1), by means of pivot means (13).

In this embodiment, adjusting spindle (15) constitutes a rotary shaft and on both end portions of said spindle, a thread is formed which is in engagement with above-mentioned nut (21).

A pair of shock absorbers (22) are mounted externally of X-shaped links (3) such that one of shock absorbers (22) is disposed at the left outer side of X-shaped links whereas the other is disposed at the right outer side of same. With this arrangement, one end of each shock absorber (22) (i.e., the lower end thereof as viewed in FIG. 4) is rotatably connected to one part of lower frame (2) and the other end of each said shock absorber (i.e., the upper end thereof as viewed in FIG. 4) is also rotatably connected to one part of link body (5) of X-shaped links (3). A rotary support pivot means (22b) is connected to the lower end of shock absorber (22). A rotary support pivot means (22a) is connected to the upper end of shock absorber (22).

With the above arrangement, when a weight load is applied downwardly upon upper frame (1), X-shaped links (3) are compressed, which is to say, reduced in height. In response to such compression of X-shaped links (3), a pair of shock absorbers (22) are resiliently shortened whereby a cushioning effect is produced in the seat suspension.

Figure 6:
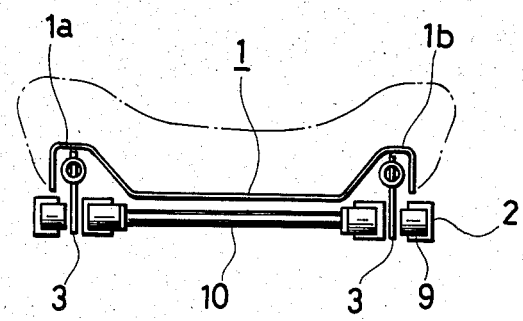
FIG. 6 is a diagrammatic front view of the seat suspension of FIG. 5.

Reference is now made to the embodiment in FIG. 6, wherein a pair of tension springs (12) and a pair of shock absorbers (22) are respectively disposed externally of, and adjacent to, X-shaped links (3) in such manner that one of the springs as well as one of the shock absorbers is positioned at the left outer side side of the X-shaped links whereas each of the other of these two elements is positioned at the right outer side of the same X-shaped links.

Accordingly, as shown in FIG. 6, it may be so arranged that such left-side group of springs (12) and shock absorbers (22) is disposed within the corresponding left side portion of a vehicle seat whereas such right side group of these elements is disposed within the corresponding right side portion of the same vehicle seat. For that purpose, upper frame (1) may be so formed as to have two raised lateral portions (1a) and (1b), respectively, at the left lateral portion thereof and at the right lateral portion thereof so that the above-mentioned left side group is allowed to move vertically in and out of the raised lateral portion (1a) of upper frame (1) while at the same time, the above-mentioned right right side group is allowed to move likewise in and out of the other raised lateral portion (1b).

Figure 1:
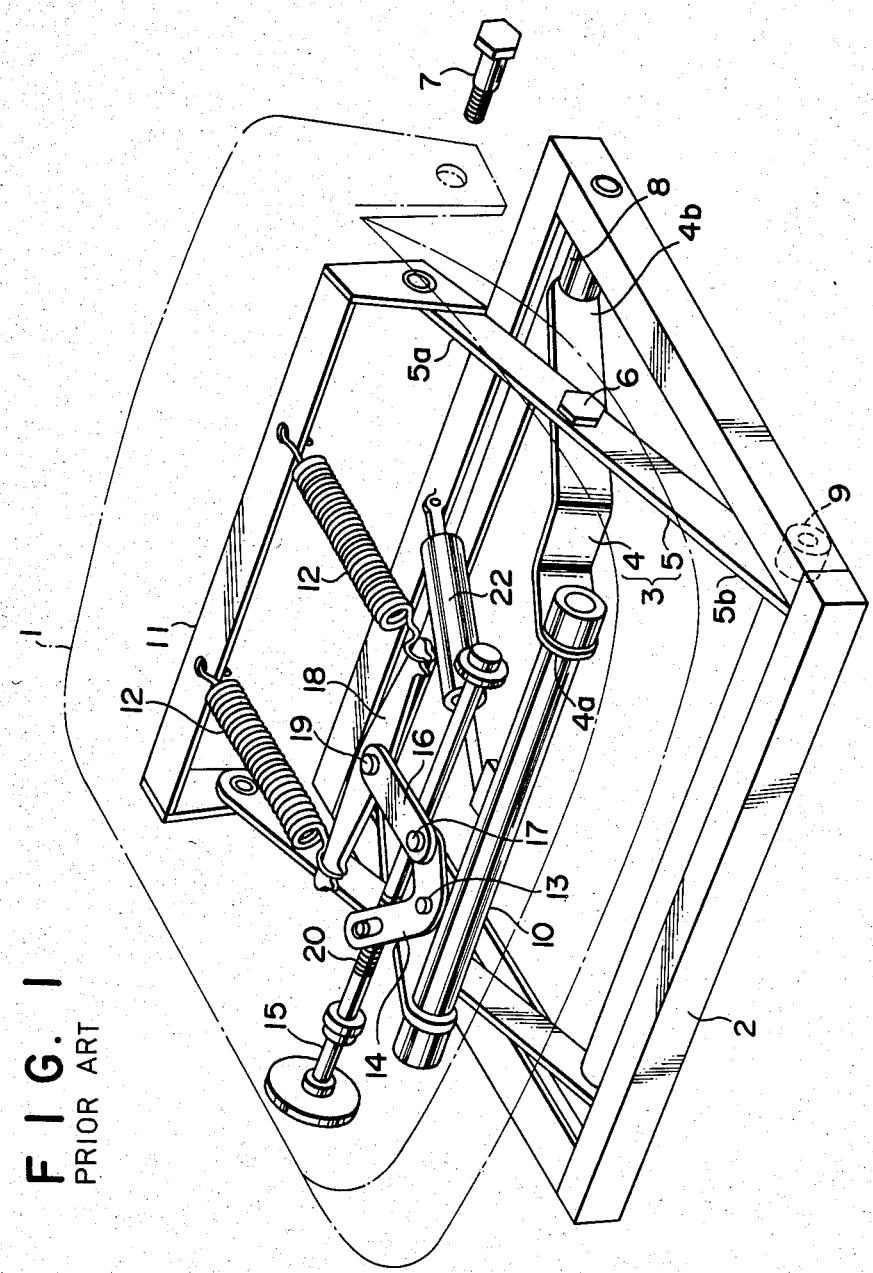
FIG. 1 is a diagrammatic perspective view of a conventional seat suspension.

Thus, it can be seen that when the vehicle seat is occupied by a person and is lowered to the lowest level, the central portion of the seat is then lowered, passing by tension springs (12), shock absorbers (22) and X-shaped links (3) finally coming to a stop at the lowest level of the seat as opposed to the conventional seat suspension illustrated in FIG. 1.

Although not shown in the drawings, at the bottoming-out of the seat, X-shaped links (3) are collapsed with both end portions of one link component (4) thereof being oriented close toward both end portions of the other link component (5), respectively, on the cross axis point (6), and at the same time shock absorbers (22) are turned downwardly relative to pivot point (22b) in response to such collapsing movement of the X-shaped links (3). As a result, each of shock absorbers (22) is shortened to the minimum length.

Figure 5:
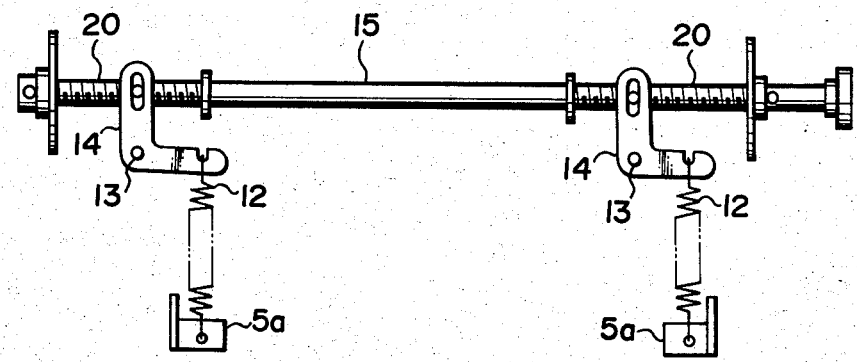
FIG. 5 is a plan view showing one portion of the seat suspension of FIG. 4.
Figure 4:
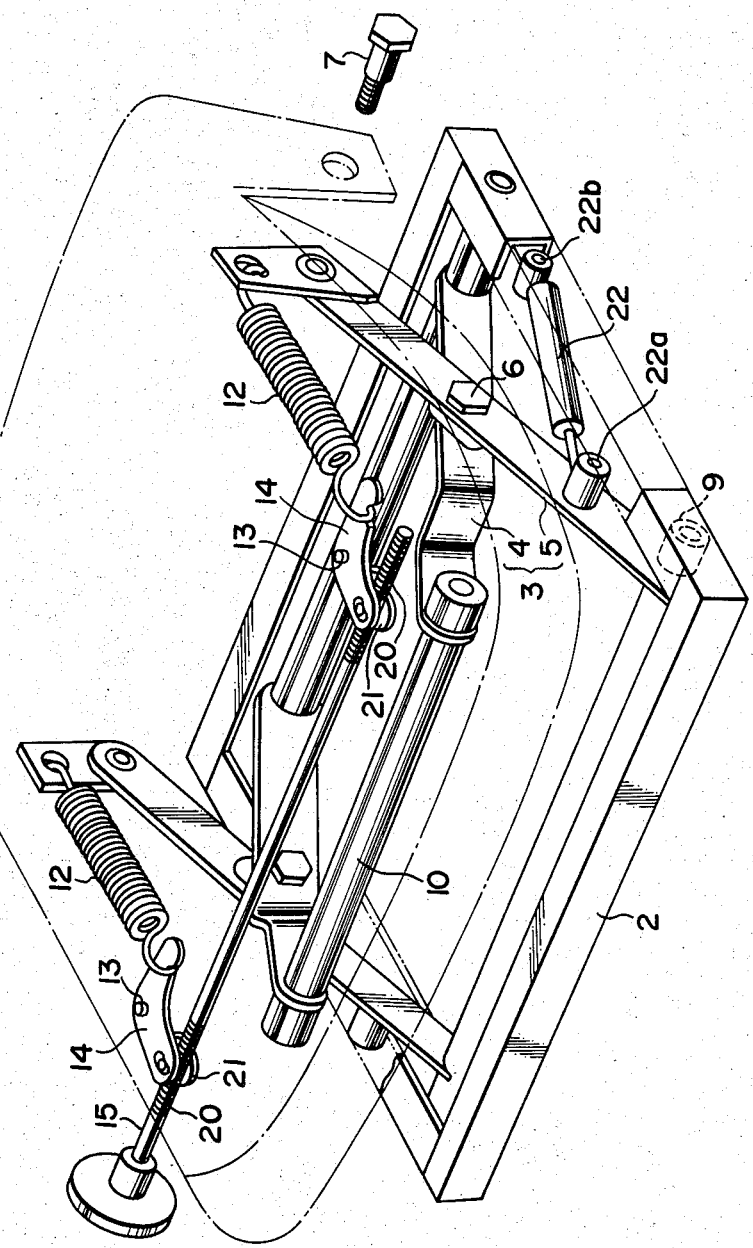
FIG. 4 is a perspective view similar to that of FIG. 1 showing one embodiment of a seat suspension according to the present invention.

According to the embodiment shown in FIG. 5, rotation of adjusting spindle (15) causes each nut (21) to move in the same direction along the axis of said spindle, and simultaneously with such movement of nuts (21), a pair of bell cranks (14) are each rotated on pivot means (13) in a direction identical to the movement of said nuts. In response to the rotation of the bell cranks (14), each of tension springs (12) connected to each of bell cranks (14) is stretched or loosened correspondingly. This means that the tension on both springs (12) is increased or decreased in an equal degree due to a force from bell cranks (14) being equally exerted or reduced on each of the springs (12). On the basis of this mechanism, it is possible to effect a desired height adjustment of the seat suspension in accordance with the weight of an occupant sitting on the seat.

Figure 7:
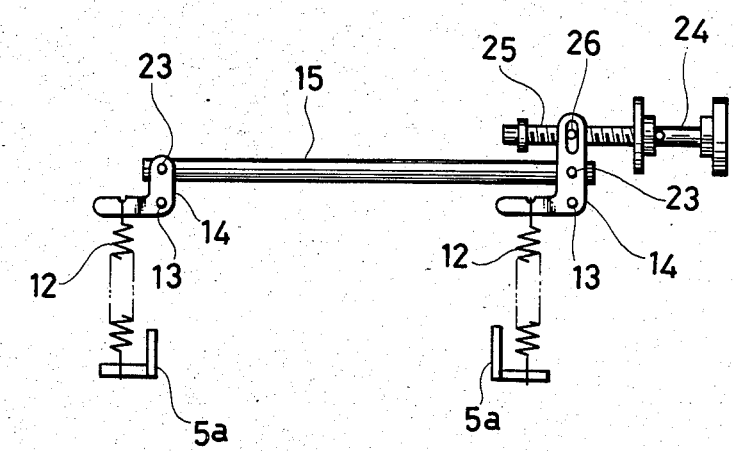
FIG. 7 is a plan view of another embodiment of the seat suspension as shown in FIG. 5.

In FIG. 7, there is illustrated another embodiment in respect to FIG. 5. In this embodiment, there is provided a first adjusting spindle (15) and a second adjusting spindle (24). First adjusting spindle (15) is movable in a transverse direction of X-shaped links (3) in such a manner that both end portions thereof are respectively connected rotatably to each of a pair of bell cranks (14) by means of a pin (23). One of bell cranks (14) is so partially elongated as to be engaged with a nut (26) which in turn is engaged with a thread (25) on second adjusting spindle. The rotation of second adjusting spindle (24), therefore, causes nut (26) to move in a direction transverse to that of X-shaped links (3) whereby left-side bell crank (14) is rotated on pivot means (13) in the corresponding direction while right-side bell crank (14) is rotated likewise in cooperative relation with the left-side bell crank. Thus, a pair of tension springs (12) are stretched or loosened correspondingly in the same manner as described earlier with reference to the embodiment of FIG. 5 thereby allowing a desired height adjustment of the seat suspension in accordance with the weight of a seated occupant.

From the foregoing description, it can be appreciated that the shock absorbers are arranged at the lower portion of the X-shape links with their height being substantially equal to that of the lower portion of the X-shaped links. Therefore the seat suspension on the whole can be of a far thinner, or shallower, profile allowing its use in a seat for a smaller sized vehicle wherein the space between the seat and the floor is relatively narrow. It will be further appreciated that the provision of a shock absorber on the left and right sides of the X-shaped links permits the use of significantly smaller and lighter weight shock absorbers and further allows for contracting the seat, including the seat suspension, to the lowest possible level in a smaller size vehicle at the bottoming-out of the seat in contrast to that possible with the conventional seat suspension described above.

What we claimed is:

1. In a seat suspension comprising an upper frame, a lower frame, a pair of X-shaped links disposed between said upper frame and said lower frame such that one of the links is disposed at the left side of said upper and lower frame while the other of the links is disposed at the right side of said upper and lower frames, each of said pair of X-shaped links being made up of (a) a first link component having a forward upper end portion at the upward positioned end thereof and a rearward lower end portion at the downward positioned end thereof and (b) a second link component having a forward lower end portion at the downward positioned end thereof and a rearward upper end portion at the upward position thereof, the arrangement of said first and second link components being such that the first link component is rotatably, pivotally fixed to the second link component at the center portion of each thereby allowing the first and second link components to be freely rotated independently of each other, each of said pair of X-shaped links being connected to said upper frame such that one of said forward upper end portion of said first link component and said rearward upper end portion of said second link component is rotatably fixed to said upper frame while the other of said forward upper end portion of said first link component and said rearward upper end portion of said second link component is slidably supported by said upper frame; and each of said pair of X-shaped links being connected to said lower frame such that one of said forward lower end portions of said second link component and said rearward lower end portions of said first link component is rotatably fixed to said lower frame while the other of said forward lower end portions of said second link component and said rearward lower end portions of said first link component is slidably supported by said lower frame, and a pair of tension springs disposed above, and adjacent to, said pair of X-shaped links, the improvement comprising:

(a) a pair of bell cranks rotatably, pivotally supported at substantially the center portion thereof;

(b) rotatable means for operating said pair of bell cranks;

(c) a pair of shock absorbers, the arrangement of said pair of shock absorbers being such that one of the shock absorbers is disposed at one lateral side of said pair of X-shaped links while the other of the shock absorbers is disposed at the other lateral side of said pair of X-shaped links, and further, that one end of each shock absorber is rotatably connected to said pair of X-shaped links, respectively; and wherein said pair of tension springs are each connected at one end thereof to one of said forward upper end portions of said first link component and said rearward upper end portion of said second link component and connected at the other end thereof to one end portion of each of said pair of bell cranks.

2. The seat suspension of claim 1 wherein each of the pair of bell cranks is connected at one end portion thereof to the other end portion of each of the pair of tension springs and engaged at the other end portion thereof with said rotatable means for operating said pair of bell cranks.

3. The seat suspension of claim 1 wherein said rotatable means for operating said pair of bell cranks comprises an adjusting spindle having a thread formed thereon and a pair of nuts which are each in engagement with said thread on said adjusting spindle.

4. The seat suspension of claim 3 wherein said pair of nuts are each engaged with the other end of each of said pair of bell cranks.

5. The seat suspension of claim 1 wherein said rotatable means for operating said pair of bell cranks comprises a first adjusting spindle movable in a transverse direction of said pair of X-shaped links, a second adjusting spindle having a thread formed thereon and a nut which is in engagement with said thread of said second adjusting spindle, and wherein said pair of bell cranks are each rotatably mounted on said first adjusting spindle by means of a pin, with the arrangement of said pair of bell cranks being such that one of said cranks are partially elongated as to be adapted for engagement with said nut and each of them is connected at one end thereof to the other end of each of said pair of tension springs.

* * * * *